Figure 1:
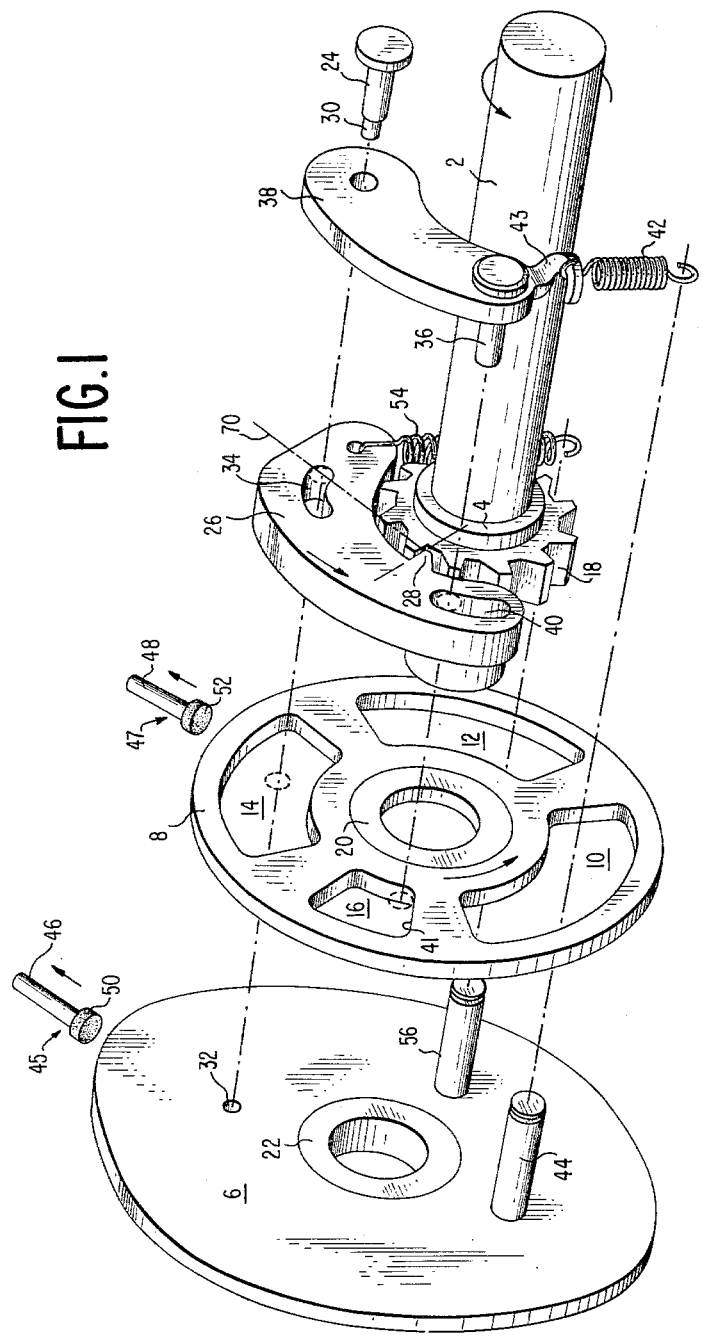

Feb. 22, 1966  S. A. OKCUOGLU  3,236,348
CLUTCH WITH CUSHION ENGAGEMENT
Filed May 22, 1964  2 Sheets-Sheet 1

INVENTOR
S. A. OKCUOGLU

BY Donald J. Drei
AGENT

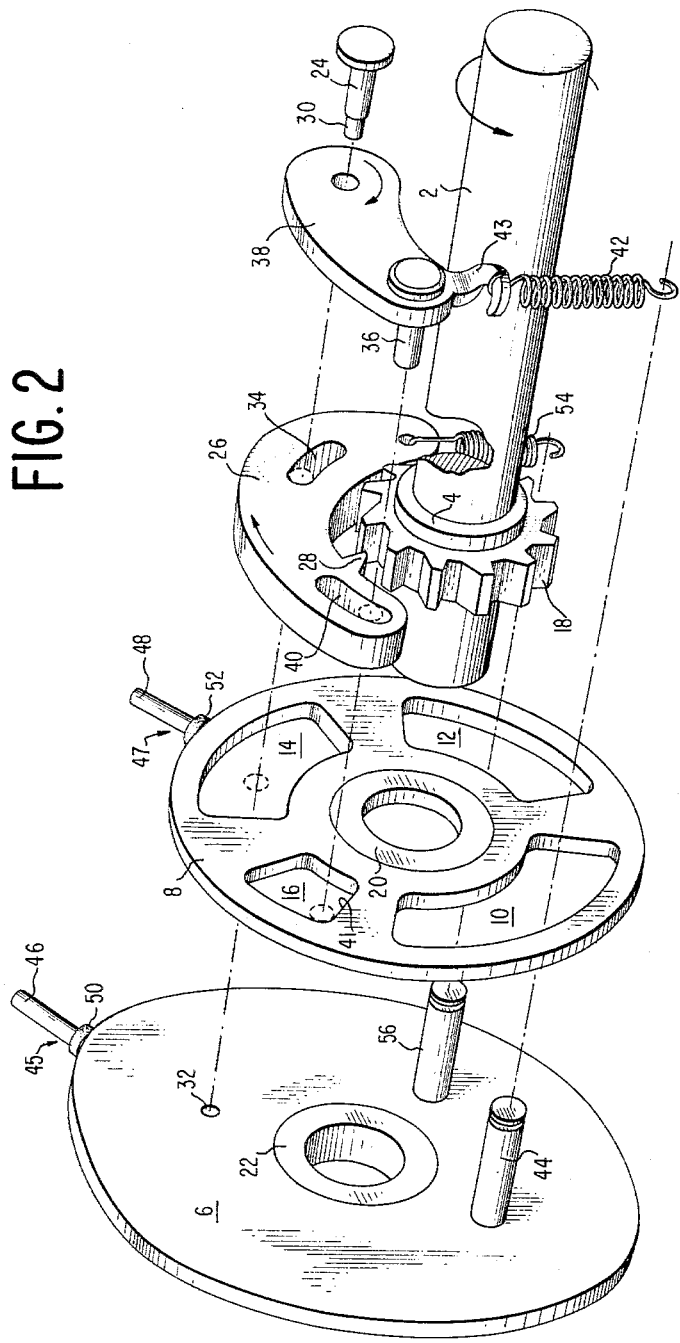

United States Patent Office 3,236,348
Patented Feb. 22, 1966

3,236,348
CLUTCH WITH CUSHION ENGAGEMENT
Selahattin A. Okcuoglu, Lexington, Ky., assignor to International Business Machines Corporation, New York, N.Y., a corporation of New York
Filed May 22, 1964, Ser. No. 369,496
8 Claims. (Cl. 192—71)

This invention relates to clutches and more particularly to mechanical clutches having a continuously rotating driving member.

In the operation of positive clutches of the type having a continuously rotating driving member, it has been found that the process of engagement of the driving and driven members is often accompanied by an undesirable destructive action between the mating clutch members. While the problem of destructive action during engagement is common to most positive clutches, the following discussion of the problem, for the purpose of simplicity, will, by way of example, focus on a specific variety of positive clutches, namely, the ratchet and pawl clutch commonly used in the electric typewriter industry. The discussion will indicate the details of the engagement process and how it produces wear which ultimately results in failure of the clutch. However, it will be understood by those in the art that the wear problem to be discussed henceforth is not only present in the ratchet and pawl clutches used in the electric typewriter field but is present in most all types of positive clutches used today.

In the electric typewriter industry as has been indicated, positive clutches using ratchets and pawls are quite common. For example, in electric typewriters there is usually, if not always, a continuously running motor powering one or more continuously driven shafts. Securely affixed to each shaft at various axial positions are a plurality of ratchets. The ratchets cooperate with pawls to drive associated cams, which are rotatably mounted on the shafts, thereby performing the various mechanical functions required of typing mechanisms. The pawls, which are connected to the cams, each have a tooth thereon which, in the driving condition, engage one of the ratchet teeth. In this particular application the cam, which is the driven clutch member, can be selectively coupled to the continuously rotating ratchet, which is the driving clutch member, by selectively bringing the pawl into engagement with the ratchet.

Each time the clutch is engaged and the pawl tooth is dropped into position between a pair of ratchet teeth, an impact results between the mating surfaces of the teeth. Assuming the speed of the ratchet is fixed, the impact produces contact forces on the mating teeth surfaces which give rise to contact pressures inversely proportional to the contact area. The contact area is commonly understood to be the area over which the contact force is distributed. The contact pressure produces two separate stresses. The first and highest stress is at the interface of the mating surfaces, but is compressive and seldom in normal operation exceeds the compressive yield limit of the material. Hence, this stress is of minor importance. The other variety of stress which results from the contact pressure is a shear stress. This stress is low at the interface and reaches a maximum at a point below the surface of the tooth. If this stress exceeds the shear endurance limit of the material, repeated cycling will produce fatigue cracks which form parallel to the surface, gradually increase, and propagate to the surface resulting in the formation of pits. Continued pitting eventually rounds-off the tooth surface and engagement with that tooth, if possible, is at best uncertain because the pawl will tend to cam out of engagement with the rounded tooth and skip to the next tooth.

Of course, in applications such as exemplified herein involving electric typewriters, timing is critical and certainty of engagement at the precise time desired is essential to proper operation. Hence, impacts giving rise to excessive contact pressures which eventually damage the mating clutch surfaces are to be avoided if proper machine operation is to exist. The obvious thing to do, then, to avoid such damage is to build a clutch having teeth which provide contact areas large enough so that excessive contact pressures do not result under the anticipated impact conditions. However, this expedient, while apparently sound in theory, has been found not to avoid clutch damage in practice due to a phenomenon known as "partial bite." Partial bite occurs when the engaging teeth are not fully engaged, and hence, the actual contact area is only a fraction of the design contact area possible under fully engaged conditions. Thus, even in apparently well-designed clutches having teeth, which in theory afford a sufficiently large contact area, destructive contact pressures may develop in operation due to this partial bite problem, which eventually damage the clutch by pitting.

Summarizing, the engagement mechanism of positive clutches inherently involves impact; impact often leads to excessive contact pressures which cause pitting; and this pitting problem, which eventually damages the clutch, is present even in apparently well-designed positive clutches due to the phenomenon of "partial bite."

The prior art attempts to obviate the clutch damage problem outlined above have taken a variety of forms. For example, often the pitting problem attributable to the high contact pressures caused by the partial bite phenomenon has been overcome by building very large clutches which even under partial bite conditions afford a contact area sufficiently large to avoid destructive subsurface shear stresses. However, often the particular application does not permit the luxury of increased size due to space limitations or low inertia requirements. Also, building a larger clutch inherently is an inefficient and more expensive way to solve the problem. Why build a large clutch, if at full bite a smaller one is all that is necessary to prevent pitting due to excessive contact pressures?

Another prior art approach has been to build clutches having a plurality of contact points wherein engagement is sequentially applied at the contact points. Such devices require complex, exact and intricate parts which are difficult to arrange in a compact manner.

The prior art attempts to design a clutch capable of withstanding the contact forces developed during engagement without excessive damage thereto, yet having no unnecessary capacity at rated speed have not been entirely satisfactory as indicated above and, furthermore, have been accompanied by disadvantages such as large size and high starting inertia.

It is therefore an object of this invention to provide an improved clutch which obviates the above-noted shortcomings of the prior art.

It is another object of this invention to provide a new, useful and simple clutch.

A still further object of this invention is to provide, in a clutch having a continuously rotating driving member, means to facilitate the complete engagement thereof before full power is transmitted to the load.

Yet another object of this invention is to provide, in a clutch having a continuously rotating driving member, a time delay between the initiation of engagement and the transmission of full power to the driven member in an improved manner.

It is a further object of this invention to provide a delayed-action clutch which has increased durability over known clutches of the same general type.

It is an additional object of this invention to provide a compact delayed-action clutch which is operable without undue wear of the mating surfaces.

It is a still further object of this invention to provide a reliable and precision delayed-action clutch which is inexpensive, easily constructed, and has a high torque capacity.

Yet another object of this invention is to provide a delayed-action clutch which accomplishes all of the foregoing objects, but does not require component parts machined to exacting specifications.

Therefore, in accordance with one aspect of this invention, a clutch having coaxial driving and driven members is provided with rotational motion transmission means, which includes a first element releasably engageable with the driving member and a second element mounted on the driven member and adapted for limited slideable engagement with the first element, and further provided with a control means coacting with the first element, which is operative in one position to disengage the first element and the driving member, and in another position to initiate engagement between the first element and the driving member whereupon the first element is driven through a specified angle becoming fully engaged prior to the impartation of motion to the driven member.

In accordance with a more detailed aspect of this invention, a clutch having a driven member, a driving ratchet, and an intermediately located clutch wheel is further provided with a dual-slotted biased pawl, which releasably engages the ratchet. In the engaged position, the pawl, following a delay sufficient to allow full engagement, transmits power to the driven member through a drive pin affixed to the driven member and passing through one of the slots. A cam follower pin, which is affixed to one end of a lever pivoted on the drive pin, passes through the other slot and responds to camming motion of the clutch wheel to disengage the pawl.

In accordance with a still more detailed aspect of this invention, a clutch having a driven member, a driving ratchet, and an intermediately located clutch wheel is provided with a dual-slotted biased pawl, which releasably engages the ratchet. In the engaged position, the pawl, following a delay sufficient to allow full engagement, becomes drivingly connected to the driven member through a drive pin fixed to the driven member and passing through one of the slots. Resilient means connecting the pawl and driven member are further provided to facilitate the partial acceleration of the driven member during the delay. A cam follower pin, which is fixed to one end of a lever pivoted on the drive pin, passes through the other slot and responds to camming motion of the clutch wheel to disengage the pawl.

One advantage of this invention is that a delayed-action clutch exhibiting negligible wear is provided, which is simply constructed and does not require high tolerance component parts. Another advantage is that the delay built into the clutch is constant, i.e., independent of load, angular velocity, or other factors, and, therefore, does not introduce timing or positional indexing inaccuracies. Additionally, the time required for clutch engagement is short; and the level of noise negligible.

The foregoing and other objects, features and advantages of the invention will be apparent from the following more particular description of a preferred embodiment of the invention, as illustrated in the accompanying drawings.

In the drawings wherein like numerals indicate like elements,

FIG. 1 depicts an exploded schematic of the clutch in perspective showing the relative position of the elements while the clutch is in the engaged condition; and FIG. 2 depicts an exploded schematic of the clutch in perspective showing the relative position of the elements while the clutch is in the disengaged condition.

*Structure of preferred embodiment*

Referring now to the figures, sketches are provided of a preferred embodiment of a clutch constructed in accordance with the principles of this invention. The clutch mechanism basically comprises three rotatable members mounted on a shaft 2 and operatively connected by suitable motion transmitting means. The first of the three shaft-mounted members is a ratchet 4 secured to the shaft 2 for rotary movement therewith. The ratchet 4 may be secured to the shaft in any convenient manner as, for example, by keying, welding, or shrink-fitting, and may have any number of teeth desired. The ratchet 4 comprises the driving member. The second member mounted on the shaft comprises a driven member or load 6. The driven member may be a cam, a flywheel, or any other member to which it is desired to transmit rotary motion. The third member mounted on the shaft comprises a clutch wheel 8. The clutch wheel 8 has a series of cut-out sections 10, 12, 14, and 16 therein, the purpose of which will become evident hereinafter. The material from which the three members, 4, 6, and 8, are constructed is not critical and may be, for example, hardened steel or suitable rubber or plastic compositions. Of importance, though, is that the teeth 18 of the ratchet 4 have sufficient hardness and toughness to withstand the degree of impact loading expected in the normal operation of clutches of this kind. Both the clutch wheel 8 and the driven member 6 are provided with journal bearings 20 and 22, respectively, designed to facilitate the rotation thereof about the shaft 2. The journal bearings 20 and 22 are press-fitted into their respective rotating members 8 and 6 and may be of any suitable type. Collars (not shown) are fitted over the shaft at appropriate places and secured thereto thereby eliminating axial movement of the load 6 and the clutch wheel 8 relative to the shaft 2. The purpose of the collars, therefore, is to restrain axial motion of the members 6 and 8 thereby limiting motion to the rotational mode.

In order to positively transmit power between the previously described ratchet 4 and the load 6, and to provide the desired delay between the initiation of engagement and the transmission of this power, a drive pin 24 and a slotted pawl 26 are provided. These two elements presently to be described comprise the rotational motion transmission portion of the clutch. The pawl 26 is provided with a tooth 28 which selectively engages one of the teeth 18 of the ratchet 4. Counterclockwise rotary motion of the shaft and ratchet combination is transmitted to the pawl 26 via the tooth 28. The counterclockwise rotary motion imparted to the pawl 26 is, in turn, imparted to the load 6. To facilitate such an impartation of motion to the load 6 from the pawl 26, a drive pin 24 is provided. This pin has its one end 30 welded into a hole 32 in the load 6 thereby securely affixing it to the load. The intermediate portion of the drive pin 24 passes through the cut-out 14 in the clutch wheel 8 and, also, through the rearward slot 34 in the pawl 26. The only requirement of the cutout 14 is that it be large enough so as not to interfere with the motion of drive pin 24. Hence, the particular configuration for the cut-out 14 is of no significance as long as it does not interfere with the drive pin motion. However, the rearward slot 34 in the pawl 26 is significant: its arcuate length determines the delay present between (a) the engagement of the pawl 26 and the ratchet 4 and (b) the eventual impartation of motion to the load 6 via the drive pin 24. Of course, it will be understood by those skilled in the art that the length of the slot, and hence, the delay, will vary with the application and needs of the user.

Assuming the shaft 2 and the ratchet 4 to be rotating and the pawl 26 disengaged from the ratchet, subsequent engagement of the pawl and ratchet rotates the pawl counterclockwise. Until the drive pin 24, which initially is positioned in the forward portion of the rearward slot 34, advances to the rearward portion of the rearward slot, the pawl 26, although engaged and rotating counterclockwise, does not transmit any motion to the load 6 via the drive pin 24. Once the pawl 26 has rotated sufficiently to advance the drive pin 24 to the rearward portion of the rearward slot 34, motion is transmitted to the load 6 via the drive pin 24. Thus, it is seen that the size of the rearward slot 34 is determinative of the amount of relay present in the clutch between the time of engagement of the ratchet and pawl and the time power is transmitted to the load via the drive pin 24. However, as will be indicated later, it is possible to transmit some power to the load during the delay period. This is accomplished via the spring 54.

Thus far, the description has been concerned with the structure of the driving member, the driven member, and the means for transmitting rotational motion between the driving and driven members. The description presently to follow will be concerned with the camming arrangement provided to effect engagement and disengagement of the pawl 26. The arrangement includes a cam follower pin 36. This pin is securely affixed to one end of a lever 38, which itself is pivotally mounted to one end of the drive pin 24. The cam follower pin 36 passes through both the forward slot 40 of the pawl 26 and the cut-out 16 of the clutch wheel 8. The length of the cam follower pin 36 is not critical. However, its length should be long enough so that it extends slightly beyond the cut-out 16 of the clutch wheel 8. While such an extension is not absolutely necessary, it insures that the cam follower pin 36 is always subject to camming action. The camming arrangement provided to actuate the pawl 26, in addition to including the lever 38 and the cam follower pin 36, also includes the cam surface 41. The cam surface 41 is conveniently provided by the lower edge of the cut-out 16 in the clutch wheel 8. Movement of the clutch wheel 8 clockwise relative to the pawl 26 causes the cam follower pin 36 to ride radially outward on the cam surface 41. The effect of such camming action is to disengage the clutch: the camming action pivots the pawl 26 about the drive pin 24 thereby raising the pawl tooth 28 out of engagement with the associated one of the ratchet teeth 18. During this disengaging period the cam follower pin 36 moves rearwardly in the forward slot 40. However, it is not essential nor desirable that the cam follower pin 36 contact the rearward end of the forward slot 40 or, for that matter, the forward end of the forward slot. Tension spring 42, connecting pin 44 and hook 43, serves merely to bias the cam follower pin 36, and hence, the pawl 26 into the engagement position. The hook 43 may be a formed part of the lever 38 as depicted or a separate hook attached to the cam follower pin 36. The pin 44 may be of any suitable type and connected in any suitable manner to the load 6.

In order that the clutch can be easily engaged and disengaged, two braking elements 45 and 47 are provided. The braking elements 45 and 47 may be of any suitable type and are shown schematically as rods 46 and 48 fitted with hard rubber tips 50 and 52, respectively. The rods 46 and 48 are mounted (not shown) for radial reciprocation. The tips 50 and 52 engage the periphery of their associated rotating members 6 and 8, respectively, and arrest their motion when actuated by any suitable means (not shown). Of course, it will be understood by those skilled in the art that the braking elements could be detents coacting with peripheral teeth located on the load 6 and clutch wheel 8, or any other well-known arrangement of elements utilized to arrest the motion of rotating members.

A tension spring 54 connects the pawl 26 and the load 6 via a pin 56. This combination is provided to produce, following disengagement, the relationship wherein the drive pin 24 is located in the forward portion of the slot 34 instead of the relationship existing prior to disengagement wherein the drive pin was located in the rearward portion of the slot. With the drive pin so positioned in the forward portion of the slot 34, the clutch is readied for the next engagement cycle.

Depending on the value of the spring constant of the spring 54, the spring may perform another function if desired. Specifically, if the spring 54 has a sufficiently large spring constant, it may serve to partially accelerate the load 6 prior to the impartation of power to the load 6 via the drive pin 24 thereby reducing the impact when a positive driving connection is finally established, following the delay, between the slotted pawl 26 and load via the drive pin 24. Of course, the spring 54 may have a spring constant sufficiently small so that during the delay between engagement of the pawl 26 and ratchet 4 and the transmission of power to the load 6 via the drive pin 24, the spring merely extends and does not serve to partially accelerate the load. Whether or not the spring 54 is used to partially accelerate the load 6 prior to directly driving the load via the drive pin 24, depends on the requirements of the particular application contemplated.

The spring 54 and connecting pin 56, like the spring 42 and pin 44, may be constructed of any well-known material and connected in any well-known manner.

The description so far has focused on the structure of the preferred embodiment of the invention and in a general way has discussed the particular coaction of the different clutch elements and their respective functions. Now, a detailed description of the operational cycle of the clutch will be presented. Specifically, the function and coactions of the different elements of the clutch will be discussed for the conditions of engagement and disengagement.

*Operation*

*Disengaging.*—The clutch disengaging operation can best be understood by first considering the relationship and disposition of the clutch elements as they are in the fully engaged condition. Now referring to FIG. 1, it is seen that when the clutch is fully engaged, both the brakes 45 and 47 are deactivated and the shaft 2 carrying the keyed ratchet 4 is rotating. The pawl 26 is rotating with both the ratchet 4 and the shaft 2 by reason of the meshed condition of the pawl tooth 28 and the ratchet teeth 18. The drive pin 24, which is positioned at the rearward end of the rearward slot 34, is transmitting rotary motion to the load 6. The clutch wheel 8, while it is rotating, does not receive its motion from the drive pin 24. It receives its motion from the cam follower pin 36, which exerts a driving force on the radially inward portion of clutch wheel cam surface 40. The tension spring 42, which is slightly contracted relative to its condition when the clutch is disengaged, urges the cam follower pin 36, which is carried by the lever 38, toward the shaft. This biasing of the cam follower pin 36 in turn pivots the pawl counterclockwise about drive pin 24. The faces of the meshed ratchet and pawl teeth are perpendicular to an imaginary line 70 drawn from the teeth faces to the center of the drive pin 24. This permits the pawl tooth 28 to slide in and out of engagement with the ratchet teeth. Increasing or decreasing the angle between the teeth faces and this imaginary line 70 would tend to lock the teeth into engagement or urge them apart as the case may be. As mentioned previously, the cam follower pin 36 will be positioned in the central portion of the forward slot 40 and slightly to the rearward.

Having described the orientation of the clutch elements during the condition of complete engagement, a discussion of the disengaging operation will now be undertaken. To disengage the clutch, the brake 47 is energized in any well-known manner (not shown), which brings the rubber tip thereof 52 into contact with the periphery of the clutch wheel 8. This braking action arrests only the rotary motion of the clutch wheel 8. The other rotating clutch elements continue to be driven by the ratchet 4, which is keyed to the shaft 2. However, this continued rotation of the remaining clutch elements is temporary. It continues uninterrupted only until the cam follower pin 36 is urged radially outward along the now stationary cam surface 40 thereby pivoting the pawl 26 about the drive pin 24. The pivoting of the pawl 26 lifts the pawl tooth 28 out of engagement with the ratchet 4 thereby effecting disengagement of the clutch. Notwithstanding disengagement of the clutch, the driven member 6 continues rotating due to its inertia. As the driven member 6 continues to rotate, the cam follower pin 36 is urged further outward along the cam surface 40 until the pawl tooth 28 is safely out of danger of contacting any of the ratchet teeth 18. At this point, the other brake 45 is activated in any well-known manner (not shown) thereby arresting the motion of the driven member 6. Now, referring to FIG. 2, it is seen that both the clutch wheel 8 and the driven member 6 are held stationary by the brakes; the cam follower pin 36 is located at the outermost part of its radial path of travel; and the pawl 26 is held out of engagement with the rotating ratchet 4. Tension spring 54, which was slightly extended during engagement, has, during this disengaging period, drawn the pawl 26 rearward thus advancing, in a relative sense, the drive pin 24 to the forward position of the rearward slot 34 thereby preparing the clutch for the next cycle of operation. The spring 54 is now in a less extended condition than it was during clutch engagement.

*Engaging.*—Clutch engagement is effected simply by de-energizing the brakes 45 and 47. This permits the clutch wheel 8 to rotate counterclockwise relative to the load 6 in response to the action of the cam follower pin 36 on the cam surface 40, the cam follower pin 36 being influenced by the biasing force of the spring 42. When this occurs, the cam surface 40 advances in the direction of rotation and the cam follower pin 36 slides radially inward along the cam surface. Such inward movement of the cam follower pin 36 pivots the pawl 26 counterclockwise about the drive pin 24 located in the forward portion of the rearward slot 34. The pivoting of the pawl 26 about the drive pin 24 brings the pawl tooth 18 into engagement with the rotating ratchet 4. The pawl 26, now engaged, rotates with the ratchet 4. However, at this point, the driven member 6 is not rotating. The rotary motion of the pawl 26 in the counterclockwise direction continues without the imparting of rotary motion to the driven member 6 via the drive pin 24 until the pawl has so advanced as to bring the rearward portion of the rearward slot 34 into driving contact with the drive pin 24. At this point, continued rotary motion of the driven pawl 26 drives the associated driven member 6 via the drive pin 24. It will be observed that from the time of pawl engagement when the drive pin 24 is located in the forward portion of the rearward slot, until the time the pawl advances thereby positioning the drive pin in the rearward portion of the rearward slot, no power is transmitted to the driven member 6 via the drive pin 24. It is this delay which enables the pawl tooth 28 to become fully engaged with the associated ratchet tooth before called upon to transmit full power. Finally, it is this delay which avoids the dangers of partial engagement under full load conditions, viz, the danger of tooth failure due to the presence of impact forces which create contact stresses that give rise to subsurface shear stresses in excess of allowable limits.

Of course, it will be understood from the previous discussion that partial acceleration of the load 6 during the delay may be provided by utilizing a spring 54 having a sufficiently large spring constant. Stated differently, motion may be imparted to the load 6 prior to time drive pin 24 advances to the rearward portion of the slot 34 by using a spring 54 sufficiently strong so that rotation of the pawl 26 not only serves to stretch the spring 54 during the delay, but transmits motion to the load 6. Provision of such a spring designed to partially accelerate the load 6 results in a two-stage acceleration of the load: the first stage being under the action of the spring 54 during the time period the drive pin 24 is moving in the slot 34 and the second stage being after this time period under the action of the drive pin 24. If two-stage load acceleration is not desired, it is only necessary to provide a spring 54 having a sufficiently low spring constant so that the spring merely extends under the action of the rotating pawl 26.

Summarizing, what has been described is the structure and operation of the preferred embodiment of a delayed action clutch constructed in accordance with the principles of this invention. Specifically, a clutch provided with means, in addition to the driving and driven members, has been shown, by way of example, which affords an opportunity for the complete engagement of the clutch before the transfer of full power to the driven member, the clutch having the optional feature of two-stage acceleration of the load.

While the invention has been particularly shown and described with reference to a preferred embodiment thereof, it will be understood by those skilled in the art that the foregoing and other changes in form and details may be made therein without departing from the spirit and scope of the invention.

I claim:
1. A clutch comprising the combination of:
    a first member mounted for rotation;
    a second member mounted for rotation coaxial with and driven by said first member;
    rotational motion transmission means, said means including a first element releasably engaging said first member and a second element mounted on said second member and connected to said first element to provide a limited slideable engagement therebetween; and
    control means coacting with said first element, said control means being operative in one position to disengage said first element and said first member and being operative in another position to initiate engagement between said first element and said first member, said first element being driven by said first member through an angle, to the extent of said sliding engagement between said elements to become completely engaged with said first member prior to the impartation of motion to the second member thereby eliminating partial bite.
2. A clutch comprising the combination of:
    a driving member mounted for rotation;
    a driven member mounted for rotation coaxial with and driven by said driving member;
    a drive-establishing element, said element having a forward and rearward slot therein, said element further having a driving member engaging portion for establishing a driving connection between said element and said driving member;
    a pin mounted on said driven member and passing through said rearward slot;
    a lever pivotally mounted at one end to said pin, said lever having at its other end a cam follower, said cam follower passing through said forward slot and being biased to establish a driving connection between said element and said driving member; and
    a control cam coacting with said cam follower, said cam being operative in one position to transmit camming motion to said cam follower for urging said element out of engagement with said driving member, and being operative in another position to initiate engagement between said element and said driving member whereupon said element is driven through an angle corresponding to the angle subtended by the rearward slot prior to the impartation of motion to the driven member.

3. A clutch comprising the combination of:

a driving member mounted for rotation;

a driven member mounted for rotation coaxial with and driven by said driving member;

rotational motion transmission means, said means including a first element releasably engaging said driving member for driving said driven member and a second element for driving said driven member mounted on said driven member and connected to said first element to provide a limited slidable engagement therebetween; and control means coacting with said first element, said control means being operative in one position to disengage said first element and said driven member and being operative in another position to initiate engagement between said first element and said driving member, said first element being driven by said driving member through an angle, to the extent of the sliding engagement between said elements to become completely engaged with said driving member prior to the impartation of motion to the driven member thereby eliminating partial bite.

4. A clutch comprising the combination of:

a driving ratchet mounted for rotation;

a driven member mounted for rotation coaxial with and driven by said ratchet;

rotational motion transmission means connecting said ratchet and driven member for transmitting rotational motion from said ratchet to said driven member, said means including a pawl adapted for releasable engagement with said ratchet, said means further including delay means connecting said pawl and said driven member for allowing full engagement of said pawl and said ratchet prior to the impartation of motion to said driven member solely by said pawl; and control means connected to said pawl, said control means being operative in one position to disengage said ratchet and said pawl and in another position to initiate engagement of said ratchet and said pawl.

5. A clutch comprising the combination of:

a ratchet mounted for rotation;

a driven member mounted for rotation coaxial with and driven by said ratchet;

a drive-establishing pawl, said pawl having a forward and rearward slot therein;

a drive pin mounted on said driven member and passing through said rearward slot in said pawl;

a lever pivotally mounted at one end to said drive pin, said lever having at its other end a cam follower, said cam follower passing through said forward slot in said pawl and being biased to engage said pawl and said ratchet; and a control cam coacting with said cam follower, said cam being operative in one position to transmit camming motion to said cam follower for urging said pawl out of engagement with said ratchet, and being operative in another position to initiate engagement between said pawl and said ratchet whereupon said pawl is driven through an angle corresponding to the angle subtended by the rearward slot prior to the impartation of motion to the driven member.

6. A clutch comprising the combination of:

a ratchet mounted for rotation;

a driven member mounted for rotation coaxial with and driven by said ratchet;

a drive-establishing pawl, said pawl having a forward and a rearward arcuate slot therein;

a drive pin mounted on said driven member and passing through said rearward slot;

a lever pivotally mounted at one end to said drive pin;

a cam follower pin mounted to the other end of said lever, said pin passing through the forward slot of said pawl and being biased to effect engagement of said pawl and said ratchet; and a control cam coacting with said cam follower pin, said cam being operative in one position to transmit camming motion to said cam follower for urging said pawl out of engagement with said ratchet, and being operative in another position to initiate engagement between said pawl and said ratchet whereupon said pawl is driven through an angle corresponding to the angle subtended by the rearward slot prior to the impartation of motion to the driven member.

7. A clutch comprising the combination of:

a ratchet mounted for rotation;

a driven member mounted for rotation coaxial with and driven by said ratchet;

a drive-establishing pawl, said pawl having a forward and a rearward arcuate slot therein;

a drive pin mounted on said driven member and passing through said rearward slot;

a lever pivotally mounted at one end to said drive pin;

a cam follower pin mounted to the other end of said lever, said pin passing through the forward slot of said pawl and being biased to effect engagement of said pawl and said ratchet;

a clutch wheel located intermediate said ratchet and said driven member and mounted for rotation coaxial therewith, said clutch wheel having apertures therein adapted to allow said drive pin and said cam follower pin to pass therethrough, said clutch wheel further having a control cam surface coacting with said cam follower pin, said cam being operative in one position to transmit camming motion to said cam follower for urging said pawl out of engagement with said ratchet, and being operative in another position to initiate engagement between said pawl and said ratchet whereupon said pawl is driven through an angle corresponding to the angle subtended by said rearward slot prior to the impartation of motion to the driven member.

8. A clutch comprising the combination of:

a ratchet mounted for rotation;

a driven member mounted for rotation coaxial with and driven by said ratchet;

a drive establishing pawl, said pawl having a slot therein;

a drive pin mounted on said driven member and passing through the slot in said pawl;

control means actuating said pawl, said control means being operative in one position to disengage said pawl and said ratchet, and being operative in another position to initiate engagement between said pawl and said ratchet, said pawl being driven through an angle corresponding to the angle subtended by the slot prior to the impartation of motion to the driven member allowing full engagement of said pawl and said ratchet prior to the impartation of motion to said driven member thereby eliminating fractured teeth resulting from the driving of said driven member prior to said full engagement.

References Cited by the Examiner

UNITED STATES PATENTS

| | | | |
|---|---|---|---|
| 2,150,227 | 3/1939 | Lake et al. | 192—28 |
| 2,659,467 | 11/1953 | Zenner | 192—28 |
| 2,762,477 | 9/1956 | Zenner | 192—28 |

DAVID J. WILLIAMOWSKY, *Primary Examiner.*